May 17, 1966  P. E. UTERHART  3,251,285
MANUALLY POWERED DRIVE FOR LOOM LENS
Filed Nov. 27, 1963  2 Sheets-Sheet 1
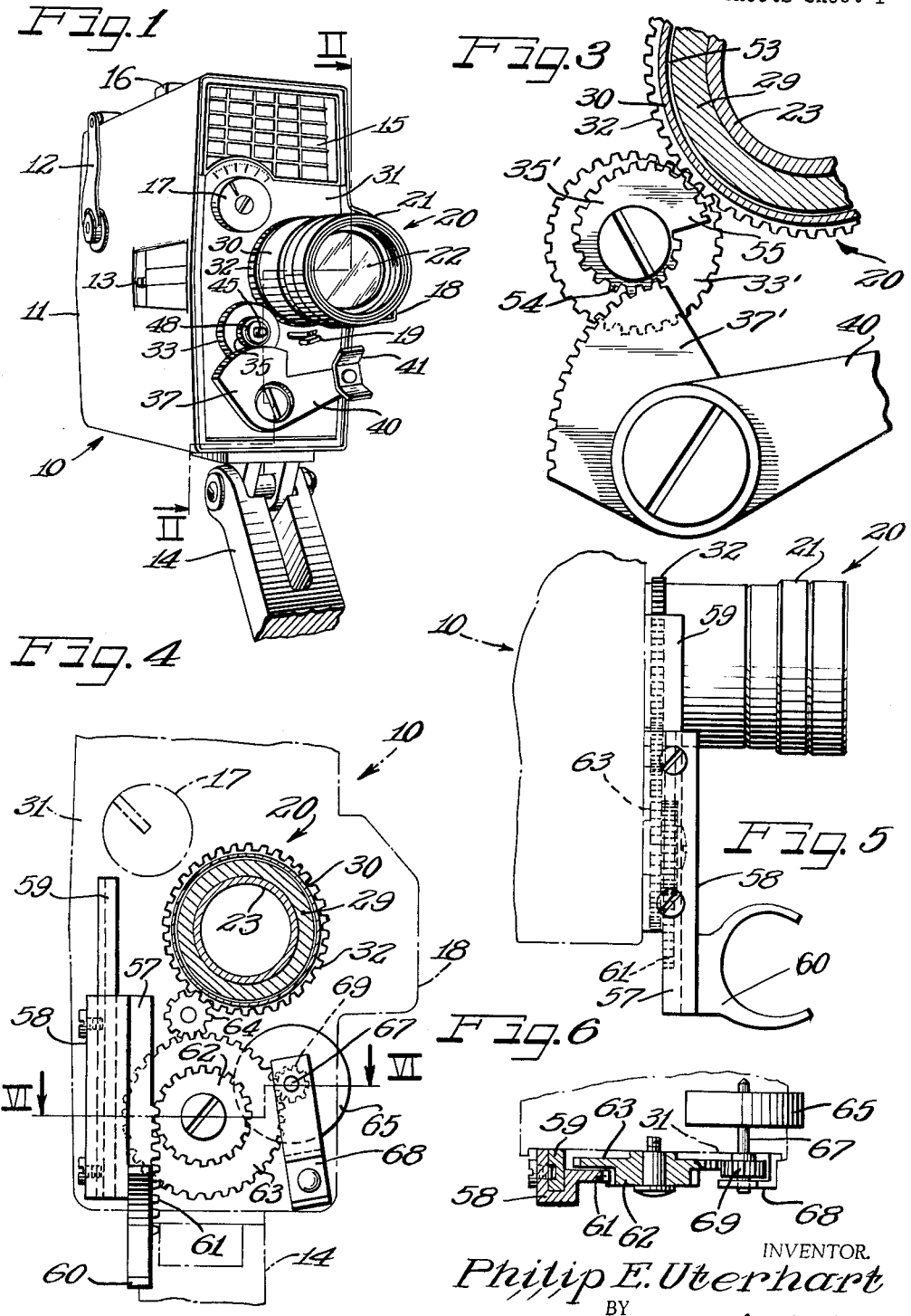
INVENTOR.
Philip E. Uterhart
BY
Barry L. Clark
ATTORNEY

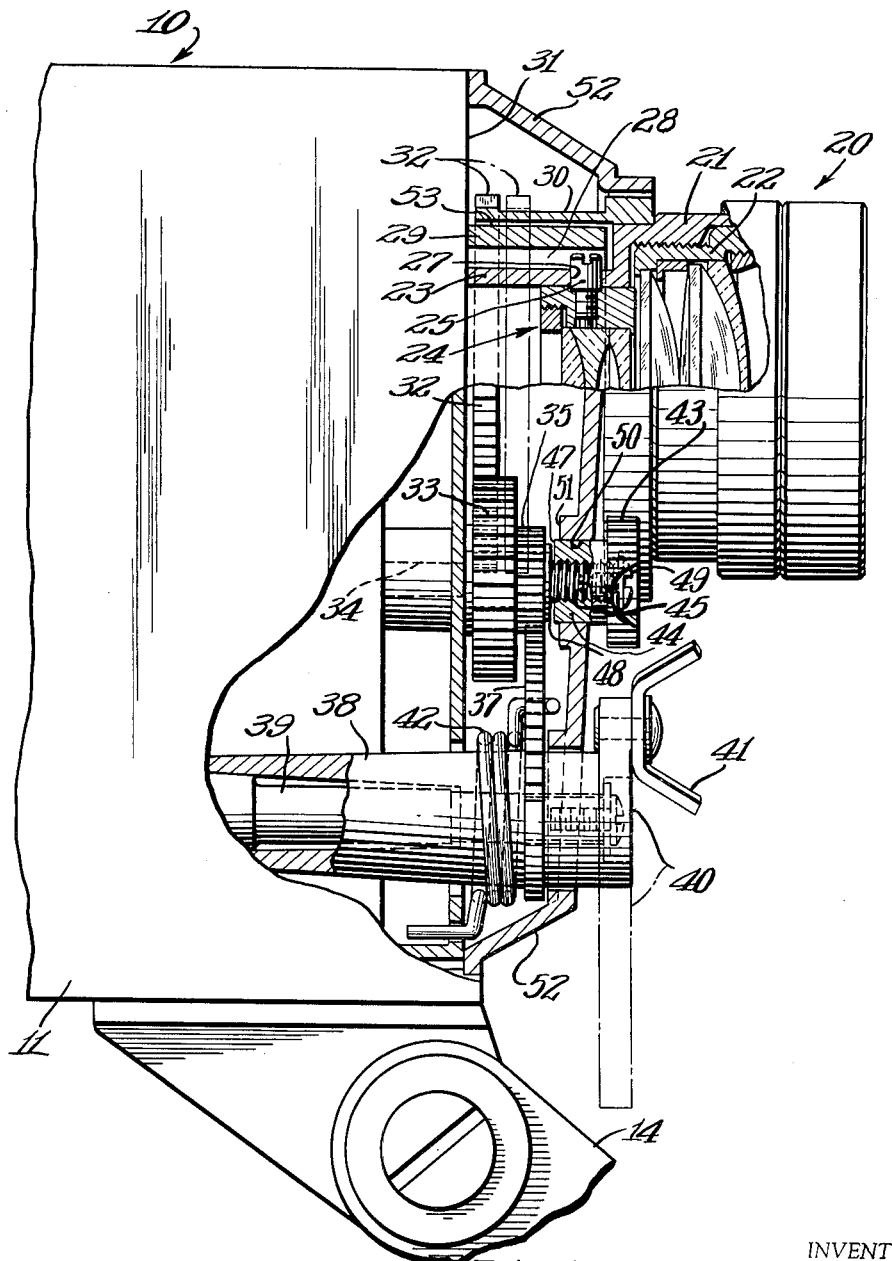

United States Patent Office 3,251,285
Patented May 17, 1966

3,251,285
MANUALLY POWERED DRIVE FOR ZOOM LENS
Philip E. Uterhart, Park Ridge, Ill., assignor to Bell & Howell Company, Chicago, Ill., a corporation of Illinois
Filed Nov. 27, 1963, Ser. No. 326,630
5 Claims. (Cl. 95—45)

The present invention relates to improvements in motion picture cameras having zoom lenses, and more particularly concerns control of the zooming movements of the movable optical elements in the zoom lenses under manual power.

In motion picture cameras embodying zoom lenses, it is desirable to be able to adjustably vary the focal length and angle of view of magnification of the lens during the continuous filming of a screen. To obtain pleasing jerk-free results in the picture taking, such adjustments must be effected in an extremely smooth manner. This presents a special problem in hand held cameras.

A very steady zoom can be obtained by the use of linkages coupling the lens to the spring wound camera drive motor. However, such motor power zoom linkages have certain inherent disadvantages, one of which is that they take power from the motor and consequently reduce the length of film that can be exposed with each wind-up. Another disadvantage lies in the fact that the camera must be running before the lens can be zoomed. This means that scenes cannot be previewed by zooming from a certain lens position unless means are provided to override or disconnect from the power linkage to enable manual zooming, or unless the film moving mechanism can be disengaged from its drive.

An important object of the present invention is to provide new and improved means for manually adjusting zoom lenses in an extremely smooth and efficient manner throughout the zoom range independently of the film drive and enabling zooming at anytime during preview of actual film of a screen.

Another object of the invention is to provide new and improved method of and means for attaining steady, smooth, even tempo zooming adjustment movements in a manually powered zoom lens assembly.

A further object of the invention is to provide a novel viscous liquid drag control for levelling manually powered zooming adjustments of zoom lens assemblies.

Still another object of the invention is to provide a new and improved zoom lens actuating structure facilitating manual zooming of a zoom lens camera.

A still further object of the invention is to provide a new and improved variable ratio zoom lens adjustment mechanism.

Other objects, features and advantages of the present invention will be readily apparent from the following detailed description of certain preferred embodiments thereof taken in conjunction with the accompanying drawings, in which:

FIGURE 1 is a perspective view of a motion picture camera embodying features of the invention;

FIGURE 2 is an enlarged fragmentary vertical sectional view taken substantially on the line II—II in FIGURE 1;

FIGURE 3 is a fragmentary front elevational view of a motion picture camera showing a modification in the manual zoom drive;

FIGURE 4 is a schematic front elevational view of a camera embodying another modification in the manual drive;

FIGURE 5 is a fragmentary side elevational view of the front end portion of the camera of FIGURE 4; and FIGURE 6 is a sectional elevational detail view taken substantially on the line VI—VI of FIGURE 4.

In all forms of the invention selected for illustration as exemplary of the present invention, an improved arrangement is provided for manual zooming through power applied by one or more fingers of the same hand in which the camera is held while filming a scene. Further, by novel method and means manual power transmission is attained in a substantially constant, level, steady, smooth, even tempo zooming movement of the zoom lens system.

Referring to FIGURES 1 and 2, a manually portable motion picture camera 10 is shown including a housing or casing 11 which may be in the form of a suitable molding or casting and provides support therein for the various and usual operating mechanism and components such as the film reels or magazine, film gate, film moving mechanism including a spring wound motor adapted to be wound by means of a handle 12 externally on the housing, operating control mechanism including a digitally movable button 13 or an alternately digitally movable button 16 accessible externally of the housing, etc. Convenient one-hand picture-taking support of the camera is facilitated by a handle 14 attached to the lower front portion of the housing 11. In this instance, the camera is equipped with an automatic exposure control (not shown), a light sensitive photo-electric cell 15 for use therewith, film speed adjustments means 17, viewfinder 18, filter adjustment means 19 and a zoom lens assembly 20.

In a preferred construction, the zoom lens 20 is essentially similar to and functions on the order of that described in Patent 3,059,533, dated October 23, 1962. However, instead of direct manual zooming of the lens through a handle on an actuating sleeve as depicted in the patent, new and improved means are provided for manual powering of the zoom lens through a digitally operable lever and transmission gearing. To this end, the zoom lens 20 includes a stepped barrel or sleeve 21 carrying in its forward portion a focusing lens cell assembly 22. Rearwardly from this in a smaller diameter cylindrical elongated tubular portion 23 is reciprocably mounted zooming lens cell 24 carrying a rigid radially outward guide pin 25 guidedly projecting through a spiral cam slot 27 in the cylinder portion 23 and engaged in a longitudinal keyway 28 in a stationary sleeve 29 fixedly mounted within the housing 11 and rotatably and reciprocably supporting the zoom lens barrel sleeve 21. Through this arrangement, rotation of the zoom lens barrel sleeve 21 about the fixed supporting sleeve 29 causes zooming reciprocal movements of the zooming lens cell 24 in the manner taught in Patent 3,059,533 between the extreme wide angle adjustment shown in FIGURE 2 and any incremental adjustment to a telephoto limit at the rear end of the zooming lens controlling spiral cam slot 27. Although not shown, a stationary lens component is mounted in the rear end portion of the lens barrel sleeve 21, and rearwardly therefrom there is mounted in the housing 11 a stationary rear objective, completing the lens system. Also, as taught in said Patent 3,059,533, means are provided for limited axial movement of the barrel sleeve 21 for maintaining a constant back focus of the entire lens system for all zooming adjustments. Such back focus compensation axial movement is, of course, small in comparison with the range of movement of zooming lens cell 24.

Rotation of the zoom lens barrel sleeve 21 for zooming adjustments is effected through a ring gear sleeve 30 mounted fixedly on or, if desired, comprising a part of the barrel sleeve 21 and of a length to extend in encompassing relation about the forward end portion of the stationary sleeve 29 and with its rear end adjacent to a front wall 31 of the camera housing 11 from which the zoom lens 20 projects a substantial distance.

Zooming rotation of the gear sleeve 30 is effected through the medium of a set of gear teeth 32 on the radially outer side of the rear margin of such sleeve with which a driving gear 33 meshes. This gear is mounted rotatably on a stud 34 fixedly mounted in forwardly projecting relation on the front wall 31. Concentrically on its front face, the gear 33 has an integral smaller diameter pinion portion 35 with which drivingly meshes a sector gear 37 which is integral with an elongated tubular hub 38 mounted in balanced bearing relation on a fixed journal spindle 39 carried by the frame structure within the housing 11 and projecting forwardly through the front wall 31. Oscillations of the sector gear 37 for zooming of the lens are effected through the hub 38 by means of a lever crank arm 40 rigid on the outer end portion of the hub, desirably spaced forwardly from the sector gear. On its outer end portion, the radial crank arm 40 carries a digitally engageable member 41 desirably in the form of a finger trough opening forwardly and mounted pivotally on the crank arm. Through this arrangement, zooming adjustments of the lens 20 can be easily and conveniently affected by engaging in the finger trough 41 a finger, such as the index finger, of the hand which engages the camera handle grip 14.

A high gear ratio enabling full range zooming in a minimum oscillating range of the zooming control lever 40, such as about 62°, is attained by a high gear ratio. In the exemplary embodiment shown, the sector gear 37 has a radius about four times that of the pinion 35, the driving gear 33 has a radius about twice that of the pinion 35, and the zoom ring gear 32 has a radius about twice that of the driving gear 33. Rapid zoom adjustments with only small swinging movements of the zooming arm 40 are thus attained.

In order to accommodate the back focus compensation limited axial movements of the zoom lens barrel sleeve 21, between the full line and dot dash line positions shown in FIGURE 2, one of the gears 32 and 33, herein the gear 33, is of sufficient width to remain in mesh with the other of the gears throughout the range of such axial relative movement.

A desirable, though optional, feature resides in providing biasing means which will normally return the manually powered zooming mechansim to the wide angle adjustment limit of the zooming lens 24. Conveniently such means comprises a coiled torsion spring 42 disposed about the hub 38 between the sector gear 37 and the adjacent wall 31, with one end of the spring anchored in stationary relation to the wall and the opposite end hooked over the edge of the sector gear toward which the sector gear moves during telephoto zooming adjustments. Thus, the sector gear is normally returned to its wide angle limit upon release of manual driving power opposing the return spring.

Whether or not the return spring 42 is utilized, a desirable optional zoom lock may be used to maintain the zoom lens in any desired adjusted condition. In a simple, convenient form, the zoom lock herein comprises a knurled knob 43 having a tubular locking stem 44 threaded on a forward smaller diameter threaded extension 45 on the fixed stud 34. At its inner end, the tubular stem 44 has an annular locking shoulder 47 which oppose and is interengageable with an opposed annular locking shoulder 48 on the adjacent end of the hub portion of the dual gear 33, 35. The length of the stud extension 45 is such that the zoom lock knob is adapted to be rotatably moved in short range, and preferably fractional turn, travel between an inward zoom-locking position when the shoulders 47 and 48 interengage, and an outward unlocking position wherein a stop head 49 of a retaining screw is engaged. In this instance, the lock knob stem 44 extends through an opening 50 defined by a flange 51, in a cover member 52 which encloses the zoom actuating mechanism. Through this arrangement, when it is desired to lock the zooming mechanism in any position of adjustment of the zoom lens, the knob 43 is turned to thrust inwardly to lock the zooming gears. Reverse turning of the locking knob 43 releases the gears for zooming adjustment.

Since it is quite difficult to apply manual zooming power in a smooth, even, non-fluctuating manner, means are provided to afford just sufficient resistance in the zooming system to substantially eliminate jerky, non-uniform zoom lens actuation and to afford level, smooth, uniform zoom rate speed. For this purpose, there is provided, by the present invention, a viscous fluctuation damping device in the system, and more particularly in association with the lens mechanism itself and comprising a shear film of viscous fluid between relatively movable parallel surfaces. Accordingly, the opposing parallel cylindrical surfaces of the fixed sleeve 29 and the zoom ring gear sleeve 30 provide therebetween a narrow space 53. It has been found that a spacing of the order of .002 to .010 of an inch is quite suitable. Within this space is applied a viscous material of preferably a thin grease-like consistency on one of the surfaces before assembly of the members and then assembling the members. The viscous resistance yieldable coupling material may be on the order of the consistency of petroleum jelly, of which a silicone compound of the type utilized as valve seal affords excellent results by virtue of its stability through a large range of temperature variables. After the surfaces have been assembled, the thin substantially uniform layer of the viscous material filling the extremely narrow space 53 between and clinging to the opposing surfaces, effects a substantial though yieldable resistance to relative rotational movement of the opposing surfaces to the extent of resistance to shear in the film of viscous fluid. As a result, jerky or uneven movements during manual propulsion of the zooming sleeve 21 are avoided.

In addition, or alternatively, the yieldable viscous resistance material may be disposed between other relatively movable surfaces in the zoom lens assembly such as between the opposing surfaces of the smaller diameter zoom sleeve portion 23 and the inside diameter surface of the fixed sleeve 29.

Where such viscous resistance fluid is disposed between the mounting ring of the zooming lens cell 24 and the opposing surrounding surface of the zooming sleeve portion 23, the viscous material will serve not only as a lubricant but also as a viscous shear film coupling. Further, it acts as an air seal between the opposing mechanism surfaces and enables the zoom lens cell 24 to act as a dash pot or air check piston within its guiding cylinder in the sleeve portion 23, whereby to assist in and form part of the resistance device against which manual power must operate in driving the zoom in its zooming adjustments.

In the modification of FIGURE 3, an arrangement is disclosed for attaining a variable ratio zooming adjustment, herein comprising rapid wide angle adjustment and progressively slower telephoto adjustment while moving the manual power input lever at constant speed, and also facilitating extremely critical telephoto adjustments at slower rates of manually powered speeds of the actuating lever or handle device. In general, the zoom lens drive is similar to that in FIGURES 1 and 2 and the zoom lens 20 is rotated for zooming adjustment by actuation of the handle lever arm 40. However, in this instance, the gear train comprising the driving gear 33', the intermediate pinion 35' and the sector gear 37' are modified to the extent that the pinion 35' comprises a spiral gear and the sector gear 37' a corresponding or complementary spiral sector. On the transmission gear pinion 35' a wide angle zoom adjustment minimum but progressively increasing radius gear tooth area 54 merges spirally into a maximum radius telephoto zoom adjustment tooth area 55 for attainment of the intended purposes and affords a smooth, progressively transitional variable gear ratio. All of the advantages of substantially fluctuation-free, smooth, even zooming are attained where the zooming system is equipped with zooming rate levelling means such as the shear film resistance device described in respect to FIGURES 1 and 2.

Another desirable zooming adjustment manual power drive device is disclosed in FIGURES 4–6, wherein details of the camera 10, as such, are the same as in the form of FIGURES 1 and 2 except that instead of a swinging lever arm actuation of the manual zooming mechanism, a rectilinearly movable rack bar 57 has a longitudinal guide rib channel 58 vertically reciprocably guided on a vertical bar 59 on the front wall 31. At its lower end, the rack bar 57 has an actuating finger trough 60 engageable by a finger of the hand which engages the camera supporting handle grip 14. Along one vertical edge, the rack bar 57 has a set of rack teeth 61 which mesh with a small diameter pinion gear 62 integral with a larger diameter driving transmission gear 63 meshing with a small diameter intermediate pinion 64 which in turn meshes with the zoom sleeve ring gear 32. Through this arrangement, vertical reciprocations of the rack bar 57 function through the gear train to effect zooming of the lens 20 throughout a range including wide angle and telephoto.

In addition to the shear film zoom rate levelling resistance feature as hereinbefore described for the camera 10, or alternatively thereto, a low inertia flywheel 65 may be incorporated in the manual power transmission system. For this purpose, the flywheel 65 may be mounted fixedly on a shaft 67 supported by a bearing bracket 68 and the front wall 31 and operatively coupled with the driving gear 63 by means of a small diameter pinion gear 69 also carried fixedly on the shaft 67. Through this arrangement, inertia of the flywheel 65 affords a power transmission levelling resistance which at least assists in avoiding fluctuations in the rate of zooming speed as effected by manual power delivered through the power receiving member, in this instance the rack 57.

It will be understood that modifications and variations may be effected without departing from the scope of the novel concepts of the present invention.

I claim as my invention:

1. A camera including a housing having a front wall, a zoom lens projecting through the front wall and including a rotatable zooming sleeve member including an external gear, gear means mounted along the front of said front wall for meshing with and driving said external gear, a hand grip adapted to be held by all but one finger on a user's hand and a pivotable, manually operable means coupled with said gear means adapted to be engaged by said one finger for driving the same to drive said zooming sleeve rotatably for effecting zooming adjustments of the lens.

2. A camera as defined in claim 1, wherein said pivotable manually operable means comprises a lever arm having on its distal end portion a finger trough within which an operating finger of the camera user's hand is engageable to permit continuous zooming adjustments in either direction of rotation.

3. A camera including a zoom lens, manually operable actuating means for zooming said lens throughout a range between maximum wide angle and maximum telephoto adjustments, and means for automatically returning the actuating means and the zoom lens to the extreme wide angle limit of the range upon release of the actuating means from manual operation.

4. A camera including a zoom lens, a manually operable actuating means for zooming said lens throughout a range between maximum wide angle and maximum telephoto adjustments, means for automatically returning the actuating means and the zoom lens to the extreme wide angle limit of the range upon release of the actuating means from manual operation, and means for selectively locking the actuating means in any position of adjustment within said range.

5. A camera including a zoom lens, and means for zooming said lens including a spiral gear and a complementary spiral toothed sector gear meshing therewith, the spiral gear having a small radius wide angle adjustment area and a larger radius telephoto adjustment area, whereby to attain fast wide angle adjustment and substantially slower telephoto adjustment in the driving of the spiral gear by the sector gear.

References Cited by the Examiner
UNITED STATES PATENTS

| | | | |
|---|---|---|---|
| 2,507,182 | 5/1950 | Young | 95—63 |
| 2,945,419 | 7/1960 | Bechtold | 95—45 X |
| 2,957,365 | 10/1960 | Sachtler | 95—68 X |
| 2,995,061 | 8/1961 | Briskin | 95—45 |
| 3,002,422 | 10/1961 | Lohmeyer | 95—45 X |

FOREIGN PATENTS 282,447 4/1952 Switzerland.

JOHN M. HORAN, *Primary Examiner.*